US005615826A

United States Patent [19]
Dixon et al.

[11] Patent Number: 5,615,826
[45] Date of Patent: Apr. 1, 1997

[54] METHOD FOR WELDING BERYLLIUM

[75] Inventors: Raymond D. Dixon, Los Alamos; Frank M. Smith, Espanola; Richard F. O'Leary, Los Alamos, all of N.M.

[73] Assignee: The United States of America as represented by the United States Department of Energy, Washington, D.C.

[21] Appl. No.: 520,632

[22] Filed: Aug. 29, 1995

[51] Int. Cl.$^6$ .................................................. B23K 15/00
[52] U.S. Cl. ................ 228/208; 219/121.14; 228/262.1; 428/650
[58] Field of Search .......................... 228/208, 262.1; 219/121.14, 121.64; 428/650

[56] References Cited

U.S. PATENT DOCUMENTS

| | | | |
|---|---|---|---|
| 3,964,667 | 6/1976 | Anderson | 228/194 |
| 4,040,822 | 8/1977 | Stern | 75/140 |
| 5,161,179 | 11/1992 | Suzuki et al. | 378/161 |
| 5,470,014 | 11/1995 | Pritchard et al. | 228/208 |

OTHER PUBLICATIONS

Survey of Processes for Joining and Cutting Materials, pp. 1–25; "Physics of Welding," pp. 34–35; *Welding Handbook*, 7th ed., American Welding Society, discloses basic background information in the welding art.

*Primary Examiner*—Kenneth J. Ramsey
*Attorney, Agent, or Firm*—Gemma Morrison Bennett; William A. Eklund; William R. Moser

[57] ABSTRACT

A method is provided for joining beryllium pieces which comprises: depositing aluminum alloy on at least one beryllium surface; contacting that beryllium surface with at least one other beryllium surface; and welding the aluminum alloy coated beryllium surfaces together. The aluminum alloy may be deposited on the beryllium using gas metal arc welding. The aluminum alloy coated beryllium surfaces may be subjected to elevated temperatures and pressures to reduce porosity before welding the pieces together. The aluminum alloy coated beryllium surfaces may be machined into a desired welding joint configuration before welding. The beryllium may be an alloy of beryllium or a beryllium compound. The aluminum alloy may comprise aluminum and silicon.

8 Claims, 3 Drawing Sheets

5,615,826

METHOD FOR WELDING BERYLLIUM

This invention was made with government support under Contract No. W-7405-ENG-36 awarded by the U.S. Department of Energy. The government has certain rights in the invention.

TECHNICAL FIELD

This invention relates to a method for welding beryllium.

BACKGROUND ART

There have been developed various methods for joining pieces of beryllium. These methods include: partially merging a welding film of silver, gold, nickel or copper onto a reinforcing unit of stainless steel which is then diffusion welded onto the beryllium (U.S. Pat. No. 5,161,179); diffusion bonding the beryllium pieces by coating at least one surface of at least one of the beryllium pieces with nickel, contacting the beryllium pieces, exposing the pieces to lower than ambient environmental pressure, and then under pressure heating the surfaces while decreasing the applied pressure (U.S. Pat. No. 3,964,667); and brazing or diffusion-welding beryllium pieces with one of a family of brazing alloys of aluminum with magnesium, or rare earth, or silicon, or tin, or copper, or palladium, or gallium, or silver, or bismuth or strontium (U.S. Pat. No. 4,040,822).

It is difficult to join very thin pieces of beryllium to each other because the heat of welding or brazing deteriorates the mechanical strength of the thin beryllium pieces. It is difficult to join pieces of beryllium thicker than about 0.1 inches to each other. Attempts to autogeneously weld beryllium in thicknesses common for industrial uses results in cracking of the beryllium.

It would be advantageous to be able to quickly and easily join beryllium pieces using a welding process so that strong, lightweight aircraft, space components or satellite parts could be fabricated from beryllium. There is still a need for ways of joining beryllium pieces directly to each other without regard for the thickness of the beryllium pieces.

It is an object of this invention to provide a method for joining pieces of beryllium.

It is another object of this invention to provide a method of fabricating parts from beryllium.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DISCLOSURE OF INVENTION

To achieve the foregoing and other objects, and in accordance with the purposes of the present invention, as embodied and broadly described herein, there has been invented a method for joining beryllium pieces comprising:

(a) depositing aluminum alloy on at least one beryllium surface;

(b) contacting said at least one beryllium surface with at least one other beryllium surface;

(c) welding said at least one beryllium surface to said at least one other beryllium surface.

After deposition of the aluminum alloy on at least one beryllium surface, the beryllium surface or surfaces which have been coated with the aluminum alloy can be subjected to pressure and elevated temperature to substantially reduce the porosity of the aluminum alloy coating or coatings.

After deposition of the aluminum alloy on at least one beryllium surface, the aluminum alloy can be machined or otherwise formed into a desired weld joint shape.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

BEST MODES FOR CARRYING OUT THE INVENTION

Figure 1A:
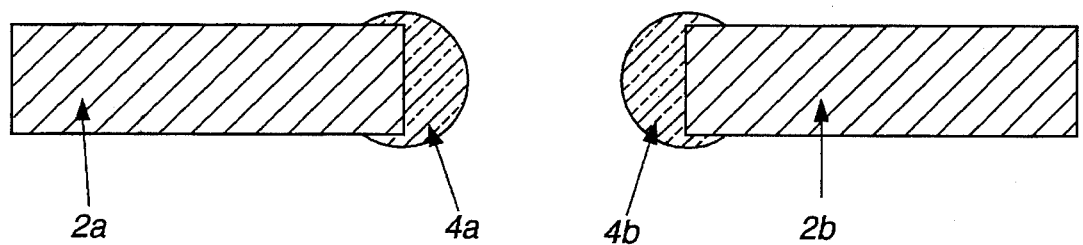
FIG. 1A is a schematic of aluminum alloy coated beryllium surfaces in a butt joint configuration.

It has been discovered that pieces containing a substantial amount of beryllium can be joined by depositing an aluminum alloy onto one or more of the faying surfaces before joining the beryllium pieces by welding the surfaces together.

The methods of this invention can be used to join pieces of elemental beryllium or alloys of beryllium which contain minor amounts of one or more other metals or compounds. For example, the beryllium alloy or compound could contain one or more of iron, aluminum, beryllium oxide, carbon, magnesium or silicon.

It has been discovered that a great variety of aluminum alloys can be successfully used in the process of this invention. The aluminum alloys are particularly advantageous because the aluminum alloys are also relatively strong, lightweight metals useful in the same environments in which beryllium is used. The aluminum alloys contemplated as useful in this invention include alloys of aluminum with from about 10 to about 15 weight percent silicon. The aluminum alloys can additionally comprise an amount in the range from greater than 0 to about 1.5 weight percent of one or more other components including, but not limited to, iron, copper, manganese, magnesium, and zinc. A combination of one or more aluminum alloys can be used on one or more of the beryllium surfaces.

Generally presently most preferred are depositions of aluminum alloy onto the surfaces of the beryllium pieces that are to be joined by employing an aluminum alloy consumable electrode in an inert gas metal arc welding process. An electric arc is struck between the consumable electrode and the beryllium. An inert gas, such as argon or mixtures of argon and helium, shields the arc and the aluminum alloy electrode from air. The choice of gas depends upon the nature of the joint being welded and the particular aluminum alloy being used.

Electrode diameter chosen will depend upon the voltage level being used and the position of the pieces to be welded. Heat from the electric arc melts the aluminum alloy from the electrode onto the surfaces of the beryllium which are to be joined.

After deposition of the aluminum alloy on at least one of the beryllium surfaces to be joined and prior to contacting the beryllium surfaces to be joined with each other, at least one of the beryllium surfaces can be subjected to pressure above one atmosphere and to elevated temperatures to reduce the porosity of the deposited aluminum alloy or alloys. This hot isostatic pressing step, if used, is presently most preferably carried out using temperatures in the range from about 400° C. to about 600° C. and pressures in the range from about 8 KSI to about 30 KSI.

After the deposition of the aluminum alloy onto at least one of the beryllium surfaces to be joined and prior to contacting the beryllium surfaces to be joined with each other, one or more of the aluminum alloy coated beryllium surfaces is machined to a weld joint shape. The invention method can be used to make butt joints (which can be beveled), step joints, fillet welds or other joints. "J" joints can be machined into step joint shapes prior to contacting and welding the surfaces or the joints can be machined into step joint shapes after deposition of aluminum alloy on the surfaces and prior to joining the surfaces.

The figures which are part of this specification show three examples of types of joints which can be made using the present invention. FIG. 1A shows two pieces of beryllium 2a and 2b which have had aluminum alloy 4a and 4b applied by spray deposition onto the ends to be joined. After machining, the aluminum alloy 6a and 6b is in a butt joint configuration.

Figure 2A:
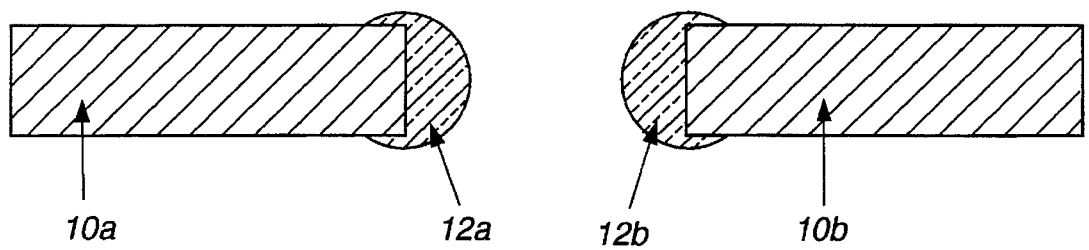
FIG. 2A is a schematic of aluminum alloy coated beryllium surfaces.

FIG. 2A shows two pieces of beryllium 10a and 10b which have had aluminum alloy depositions 12a and 12b applied to the surfaces to be joined. After machining, the aluminum alloy depositions 14a and 14b are in a step joint configuration.

Figure 3A:
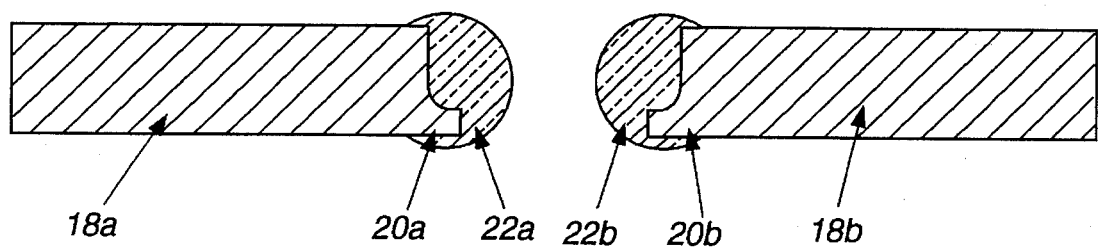
FIG. 3A is a schematic of aluminum alloy coated beryllium surfaces in a "J" groove configuration.
Figure 3B:
FIG. 3B is a schematic of the aluminum alloy coated beryllium surfaces of FIG. 3A after machining into a step joint configuration.

FIG. 3A shows two pieces of beryllium 18a and 18b which have "J" joint configurations 20a and 20b. After spray deposition of aluminum alloy 22a and 22b onto the ends to be joined, the aluminum alloy coated ends are machined so that the aluminum alloy depositions 20a and 20b are in a step joint configuration, as shown in FIG. 3B.

The aluminum alloy coated surfaces of the pieces of beryllium to be welded are then placed into contact with each other and welded. Any of the traditional welding methods such as gas tungsten arc welding, electron beam welding, resistance welding, flash welding, or laser beam welding can be used.

Figure 1B:
FIG. 1B is a schematic of the aluminum alloy coated beryllium surfaces of FIG. 1A which have been machined in a butt joint configuration.
Figure 1C:
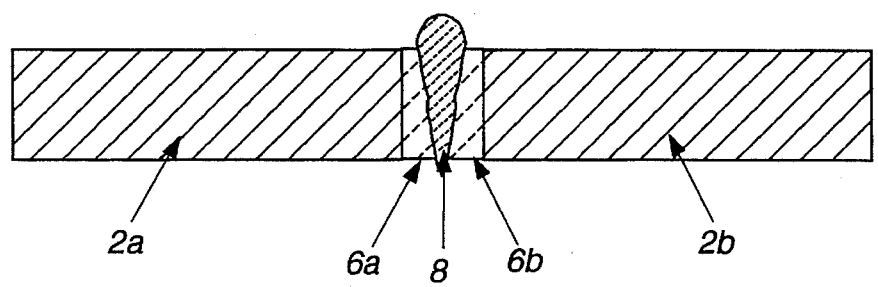
FIG. 1C is a schematic of an electron beam welded butt joint of the aluminum alloy coated beryllium surfaces of FIGS. 1A. and 1B.
Figure 2B:
FIG. 2B is a schematic of the aluminum alloy coated beryllium surfaces of FIG. 2A which have been machined in a step joint configuration.
Figure 2C:
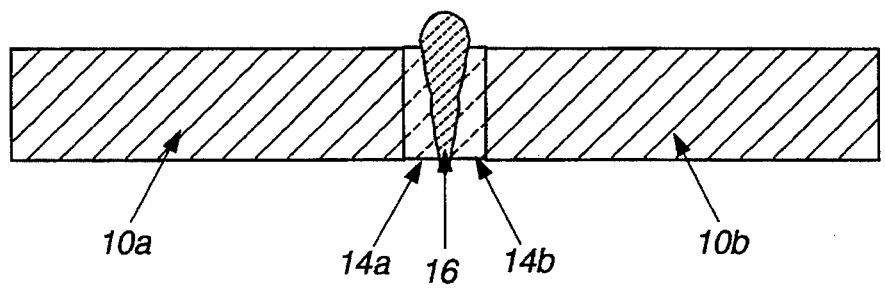
FIG. 2C is a schematic of an electron beam welded step joint of the aluminum alloy coated beryllium surfaces of FIGS. 2A. and 2B.
Figure 3C:
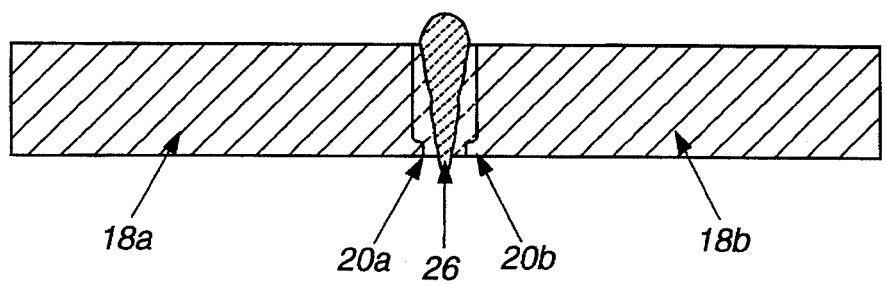
FIG. 3C is a schematic of an electron beam welded step joint of the aluminum alloy coated beryllium surfaces of FIGS. 3A and 3B.

FIGS. 1C, 2C and 3C show examples of welds of the types of joint which can be made using the present invention. FIG. 1C shows the same two pieces of beryllium 2a and 2b from FIGS. 1A and 1B after the machined aluminum alloy depositions 6a and 6b have been contacted and electron beam welded with the electron beam weld 8 in the characteristic configuration for a weld of that type.

FIG. 2C shows the same two pieces of beryllium 10a and 10b from FIGS. 2A and 2B after the machined aluminum alloy depositions 14a and 14b have been contacted and electron beam welded with the electron beam weld 16 in the characteristic configuration for a weld of that type.

FIG. 3C shows the same two pieces of beryllium 18a and 18b from FIGS. 3A and 3B after the machined aluminum alloy depositions 20a and 20b have been contacted and electron beam welded with the electron beam weld 26 in the characteristic configuration for a weld of that type.

The following examples will demonstrate the operability of the invention.

EXAMPLE I

The beryllium used in this example was an alloy with the composition shown in Table 1.

TABLE 1

Composition of Beryllium Alloy Used in Runs in Example I
The beryllium alloy was commercially available from Brush
Welman Corporation as 5.2008 inch diameter Be disks.

| Component | Minimum Weight % | Maximum Weight % |
| --- | --- | --- |
| Beryllium | 98.0 | |
| Beryllium oxide | | 1.5 |
| Aluminum | | 0.07 |
| Iron | | 0.12 |
| Carbon | | 0.10 |
| Magnesium | | 0.08 |
| Silicon | | 0.08 |
| Sulfur | | 0.04 |
| Uranium | | 0.04 |
| Other elements, each | | 0.04 |

The beryllium alloy was commercially available from Brush Welman Corporation as 5.2008 inch diameter Be disks. Six rings of beryllium (Samples 1 through 6) having inside diameters of 4.936 inches, outside diameters of 5.1 inches and lengths of 0.538 inch were cleaned by the following sequence of steps: Blue Gold and ultrasonic degreasing for 3 minutes at 60° C.; alkaline soaking for 3 minutes; pickling in $HNO_3$/HF until bright; deionizing in a water rinse; and finally, air drying.

A 0.35 inch diameter 4047 aluminum alloy (718 aluminum) shielded metal inert gas welding wire electrode commercially available from Washington Alloy Company was used for the aluminum alloy deposition. This aluminum alloy electrode contained from 11.0 to 13.0 weight percent silicon, a maximum of 0.8 weight percent iron, a maximum of 0.30 weight percent copper, a maximum of 0.15 weight percent magnesium, 0.10 weight percent magnesium, a maximum of 0.20 weight percent zinc, and up to 0.15 weight percent other materials, with the rest of the alloy being aluminum.

The aluminum alloy was deposited onto the surfaces of the six beryllium rings to be joined with one pass of the welder over each of the beryllium surfaces to be joined. This resulted in a coating of aluminum alloy approximately 0.05 inches thick on the beryllium surfaces. The coating was allowed to cool in the fixture.

Then the beryllium rings with the aluminum alloy deposition were tested for porosity of the aluminum alloy coating with a 300 kV X-ray system. The X-rays were examined visually for porosity using a 5X hand held magnifying glass. The porosity of each of the rings was as reported in the second data column in Table 2.

TABLE 2

Porosity of Aluminum Alloy Deposition Layer
After testing for porosity, the 6 rings were placed in a hot isostatic press with a 17 inch diameter by 30 inch long hot zone and subjected to 30 KSI pressure of argon at 500° C. for one hour.

| Sample | Maximum Pore Diameter, in. (First Test) | Maximum Pore Diameter, in. (Second Test) | Maximum Pore Diameter, in. (Third Test) |
| --- | --- | --- | --- |
| 1 | 0.01 | 0.01 | 0.003 |
| 2 | 0.01 | 0.01 | 0.003 |
| 3 | 0.01 | 0.01 | 0.003 |
| 4 | 0.01 | 0.01 | 0.003 |
| 5 | 0.01 | 0.01 | 0.003 |
| 6 | 0.01 | 0.01 | 0.003 |

After testing for porosity, the 6 rings were placed in a hot isostatic press with a 17 inch diameter by 30 inch long hot zone and subjected to 30 KSI pressure of argon at 500° C. for one hour.

The rings were once again tested for porosity in the same manner using the same equipment described above after the hot isostatic press treatment to verify porosity reduction.

The results of the second porosity test were as shown in the third data column of Table 2.

Each of the beryllium rings with the aluminum alloy deposition were then machined using standard turning equipment into a butt or step weld joint configuration as shown in FIGS. 1B and 2B.

The machined rings were X-rayed for a third time in the manner described above to determine post machining porosity of the aluminum alloy deposition layer. The results were as reported in the four data column in Table 2.

A vacuum high voltage electron beam welder rated at 150 kV and 50 mA was used to join the beryllium rings. Welding parameters used varied depending upon the thickness of the joint made and were as shown in Table 3.

TABLE 3

Electron Beam Weld Parameters Used in First Six Runs

| Run | Voltage, kV | Current, mA | Travel speed in/min | Focus Condition |
| --- | --- | --- | --- | --- |
| 1 | 90 | 7.5 | 10 | sharp + 0.012 |
| 2 | 100 | 7.5 | 30 | sharp + 0.01 |
| 3 | 100 | 8.0 | 20 | sharp + 0.12 |
| 4 | 100 | 9.5 | 20 | sharp + 0.01 |
| 5 | 100 | 9.5 | 20 | sharp + 0.01 |
| 6 | 100 | 9.5 | 20 | sharp + 0.01 |

The resulting 3 welded pans which were each made from 2 of the rings were x-rayed using a 300 kV X-ray system. The X-rays were examined visually for porosity using a 5X hand held magnifying glass. No porosity was detectable with this visual inspection.

The parts were visually inspected. Each of the three welded pans exhibited an excellent surface appearance. Some "suck-back" (excess material from the weld extruding from the opposite side of the beryllium pieces from the side on which the weld applied) was observed.

These results demonstrate that the methods of this invention can be successfully used to obtain sound, welded joints between beryllium pieces in a relatively simple and economical procedure.

EXAMPLE II

Twelve more rings of the same beryllium alloy used in Example I were tested to demonstrate the effect of multiple depositions of aluminum alloy on the surfaces of the beryllium to be joined prior to electron beam welding. The twelve beryllium rings (Samples 7 through 18) with 4.936-inch inside diameter, 5.1-inch outside diameter, and 0.538 inch-length were processed in exactly the same manner and using the same equipment as the six beryllium rings in Example I with the exception that after the first deposition of aluminum alloy, a second deposition was made on the surface of the first deposition of aluminum alloy. The second deposition of aluminum alloy was applied in the same manner as the first using the same equipment and same aluminum alloy consumable electrode. The resulting aluminum alloy coatings were a total of approximately 0.1 inch thick and had the porosities reported in Table 4.

TABLE 4

Porosity of Aluminum Alloy Deposition Layer

| Sample | Maximum Pore Diameter, in. (First Test) | Maximum Pore Diameter, in. (Second Test) | Maximum Pore Diameter, in. (Third Test) |
| --- | --- | --- | --- |
| 8 | 0.01 | 0.01 | 0.003 |
| 9 | 0.01 | 0.01 | 0.003 |
| 10 | 0.01 | 0.01 | 0.003 |
| 11 | 0.01 | 0.01 | 0.003 |
| 12 | 0.01 | 0.01 | 0.003 |
| 13 | 0.01 | 0.01 | 0.003 |
| 14 | 0.01 | 0.01 | 0.003 |
| 15 | 0.01 | 0.01 | 0.003 |
| 16 | 0.01 | 0.01 | 0.003 |
| 17 | 0.01 | 0.01 | 0.003 |
| 18 | 0.01 | 0.01 | 0.003 |

The test runs made in Example II further demonstrate the operability of the invention. These runs also demonstrate that when a thicker layer of aluminum alloy is desired on the beryllium pieces before contacting and welding the beryllium pieces, the aluminum alloy can be deposited in sequential layers onto the beryllium pieces.

The welding process of this invention provides a quick and easy way to join pieces of beryllium. Using the process of this invention enables deeper welds in beryllium pieces to be made than could be made using other conventional methods. Once beryllium pieces are joined using the process of this invention, the surfaces of the articles can be further finished by machining over the weld or by use of other finishing processes known in the art. However, the process of this invention results in joined beryllium articles which do not require machining or further finishing before most uses. The process can be carried out using simple, lightweight equipment; generally, an alternating current or direct current power supply, power cables, and welding torch are all that are required.

While the articles of manufacture and methods of this invention have been described in detail for the purpose of illustration, the inventive articles of manufacture and methods are not to be construed as limited thereby. This patent is intended to cover all changes and modifications within the spirit and scope thereof.

INDUSTRIAL APPLICABILITY

The methods of this invention can be used to fabricate parts for use in many applications that require materials with a high strength to weight ratio and which have high thermal conductivity. Beryllium parts made using the methods of this invention can be used as structural components in aircraft, satellites and space applications.

What is claimed is:

1. A method for joining beryllium pieces comprising:
   (a) depositing aluminum alloy on at least one beryllium surface;
   (b) contacting said at least one beryllium surface with at least one other beryllium surface; and
   (c) welding said at least one beryllium surface to said at least one other beryllium surface.

2. A method as recited in claim 1, wherein after deposition of said aluminum alloy on said at least one beryllium surface and prior to contacting said at least one beryllium surface with said at least one other beryllium surface, said at least one beryllium surface is subjected to pressure above one atmosphere and elevated temperature.

3. A method as recited in claim 1, wherein after deposition of the aluminum alloy on at least one beryllium surface and prior to contacting said at least one beryllium surface with said at least one other beryllium surface, said at least one beryllium surface is machined into a weld joint shape.

4. A method as recited in claim 1, wherein after depositing said aluminum alloy on said at least one beryllium surface, and after contacting said at least one beryllium surface with at least one other beryllium surface, said at least one beryllium surface is welded to said at least one other beryllium surface by an electron beam welding process.

5. A method as recited in claim 1 wherein said aluminum alloy is deposited on said at least one beryllium surface using a metal arc welding process.

6. A method as recited in claim 1 wherein said at least one aluminum alloy is comprised of aluminum and silicon.

7. A method as recited in claim 1 wherein said beryllium is one chosen from the group of beryllium, beryllium alloys and beryllium compounds.

8. Beryllium pieces joined by the method of claim 1.

* * * * *